United States Patent

Shaw et al.

[11] Patent Number: 4,907,774
[45] Date of Patent: Mar. 13, 1990

[54] HANGER SUPPORT DEVICE

[75] Inventors: Anthony J. Shaw, Chappaqua, N.Y.; Lawrence W. Paricio, Wayne, N.J.

[73] Assignee: D. Klein & Son, Inc., Lodi, N.J.

[21] Appl. No.: 286,623

[22] Filed: Dec. 19, 1988

[51] Int. Cl.[4] ............................................. F16B 45/00
[52] U.S. Cl. ..................... 248/306; 24/460; 24/513; 206/291; 211/89; 211/124; 248/316.1
[58] Field of Search ................... 248/306, 316.2, 316.1, 248/316.3, 316.5, 316.6, 309.1; 24/460, 513, 515, 521; 206/289, 290, 291, 293, 279; 211/89, 124

[56] References Cited

U.S. PATENT DOCUMENTS

| | | | |
|---|---|---|---|
| 3,270,994 | 9/1966 | Machan et al. | 248/316.5 X |
| 4,043,528 | 8/1977 | Benoit et al. | 248/316.6 X |
| 4,618,058 | 10/1986 | Gregg et al. | 206/291 |
| 4,640,414 | 2/1987 | Mobley et al. | 206/291 X |
| 4,769,878 | 9/1988 | Liao | 206/279 X |
| 4,798,289 | 1/1989 | Mobley | 206/291 X |

OTHER PUBLICATIONS

Quick Release Ladder Clamp (Research Disclosure), Sep. 1980, pp. 365 and 366.

Primary Examiner—Ramon O. Ramirez
Attorney, Agent, or Firm—Darby & Darby

[57] ABSTRACT

An improved hanger support apparatus is formed of a U-shaped frame having a pair of parallel and spaced-apart legs. A latch arm is pivotly mounted to one of the legs proximate its end and is biased to contact the second leg at a point inwardly of its end. The construction of the latch arm provides a "one-way" action, and permits conventional hangers to be inserted past the latch arm into the apparatus for support thereby, while preventing the inadvertent removal of the hangers. A handle is provided for manual operation of the latch arm to allow the latch arm to be pivoted away from the second arm when manual removal of a hanger is desired. The hanger support apparatus is particularly adapted for use in garment bags and similar pieces of luggage.

14 Claims, 1 Drawing Sheet

U.S. Patent    Mar. 13, 1990    4,907,774
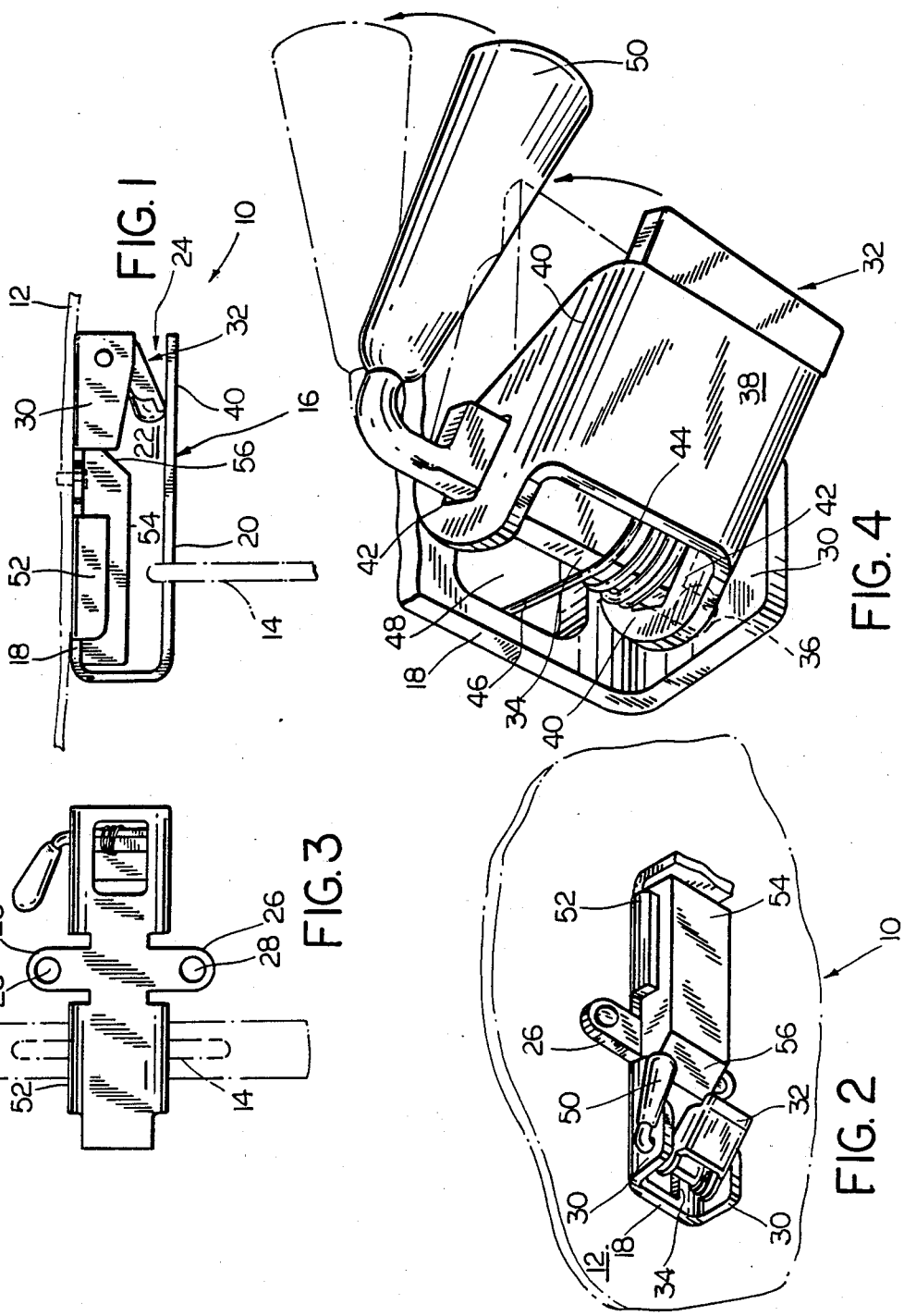

HANGER SUPPORT DEVICE

The present invention relates to a new and improved device for the support of clothes hangers and the like, and in particular to such a device particularly adapted for use in conjunction with articles of luggage.

BACKGROUND OF THE INVENTION

Certain articles of luggage, and in particular such items characterized as garment bags, allow for the packing and transport of articles of clothing suspended from hangers of more or less conventional design. The use of such luggage is well appreciated by the public, as it allows the items packed therein to be transferred to the luggage directly from a closet without the necessity for removal from a hanger and folding; allows the items to be transported within the luggage in a more natural position, free from much of the folds and wrinkles that would otherwise be created; and allows the articles to be subsequently removed and again passed directly to a closet at the end of travel.

Such garment bags usually have a means for supporting the hangers in position. Often such means is in the form of a rack or bar extending across the depth of the bag. The construction of such racks, however, often leaves much to be desired. The hangers are not effectively restrained upon the rod, and the jostling of the luggage that often occurs during travel results in the dislodging of the hangers from the rack or bar and the resultant disarray of the garments hung thereon. In addition, it is often difficult or inconvenient to place the hangers on the rod or to remove the hangers from the rod.

In an effort to eliminate this problem, special hangers have been provided in which the hook portion is pivotable to a latched position in which it clamps on to the support bar, and an unlatched position in which the hook is conventionally mounted on a closet support bar. However, these hangers also leave much to be desired. For example, the use of such special hangers required the suits or gowns, as the case may be, to be transferred from regular hangers to the special hangers and back again at the end of the trip. Aside from the added inconvenience of transferring clothing from one hanger to another, there is an increased probability of creasing the garments. Moreover, it has been found that in transit the hook portions tend to pivot and unlatch from the support bar thereby permitting the clothing to crumple within the garment bag.

BRIEF SUMMARY OF THE INVENTION

It is therefore a purpose of the present invention to provide an improved hanger-retaining device which avoids the shortcomings of the prior art.

It is a further purpose of the present invention to provide such a hanger-retaining device which may be utilized in a variety of positions and orientations.

Yet another purpose of the present invention is to provide such a device which allows for the simplified insertion of hangers therein, yet retains the hangers in position until such time as they are intended to be removed.

Still another purpose of the present invention is to provide such a hanger support device which is both efficient to manufacture and easy to operate.

In accordance with the above and other objects and purposes, the support device of the present invention comprises a generally U-shaped body member adapted to be mounted to a luggage item wall and dimensioned to accept one or more hanger hooks within the legs of the U such that the hangers are supported by leg. The open entrance end of the U is provided with a latch mounted to one leg, normally biased into a position against the opposite leg, sealing the entrance. The latch is so positioned that a "one-way" action is created, whereby the hangers may be passed inwardly between the legs of the U, the latch opening to allow passage therethrough, the latch otherwise remaining biased in the closed position, preventing passage of the inserted hangers outwardly between the legs of the U. The latch mechanism is further provided with an arm for manual activation thereof, whereby the latch may be opened by the user to allow removal of the hangers from the device when desired.

DESCRIPTION OF A PREFERRED EMBODIMENT

A fuller understanding of the present invention may be obtained upon consideration of the following description of a preferred, but nonetheless, illustrative embodiment thereof, when taken in conjunction with the annexed drawings, wherein:

FIG. 1 is a side elevation view of the invention;

FIG. 2 is a cut-away perspective view of the invention with a leg of the body member removed;

FIG. 3 is a rear elevation view of the invention; and

FIG. 4 is a detailed perspective view of the latch mechanism portion of the invention.

DESCRIPTION OF A PREFERRED EMBODIMENT

With reference to the Figures, the hanger support device 10 of the present invention is adapted to be mounted to a wall 12 of a garment bag or other structure in or to which the suspension of hangers 14 is desired. While the invention as shown in the Figures is represented in a horizontal position, it is to be appreciated that the unit 10 may be mounted in a variety of positions, including a vertical position affixed either to a vertical wall segment or to a horizontal wall segment such as may be presented by the top wall portion of a garment bag.

The support unit 10 may be formed with a U-shaped body or frame member 16, the parallel spaced legs 18, 20 of which define a volume 22 therebetween having an entranceway 24 through which the upper hook portion of hangers 14 may be inserted into the device. The frame 16 may be formed of any appropriate material, such as brass plate, and may be fabricated with a pair of integral and opposed mounting ears 26 on rear leg 18 having bores 28 to facilitate mounting of the device upon a wall surface.

Frame leg 18 may be further fabricated with a pair of opposed flange elements 30, folded inwardly at right angles to the leg, which serve as the mounting means for a latch arm 32 which provides a "one-way" gate across the entranceway 24. In particular, and as may best be seen in FIG. 4, latch arm 32 is mounted between the flanges 30 upon axle 34, which is journaled for rotation within opposed bores 36 in the flanges 30. Latch arm 32 has a main latch body portion 38 which is flanked by opposed right angle latch arm shoulder 40. These shoulders are provided with bores 42 to accept the axle 34.

The portion of latch arm 32 extending through the latch arm bores 42 has a noncircular, and preferably generally rectangular cross-section, as do the bores 42, to lock the latch arm 32 to the axle 34 to permit rotation of both pieces as a unit. A spring 44 is wrapped around axle 34 between the arm shoulders 40, and has a first end 46 engaging the clamp frame 16 through aperture 48 in leg 18 and its second end (not shown) engaging the inner surface of main latch portion 38. The ends of spring 44 so engage the frame and latch arm as to bias the latch arm in the counter-clockwise direction as shown in FIG. 4, against the outer leg 20 of the frame 16 as seen in FIG. 1.

The axle 34 is further provided with an exterior right angle portion having handle 50, use of which permits latch arm 32 to be pivoted counter-clockwise as shown in phantom in FIG. 4, resulting in the opening of the entranceway 24 between the frame legs to allow hangers to be removed.

Leg 18 may be further provided with an integral pair of opposed, inwardly directed edge members 52 at right angles to the leg wall. A resilient bumper insert member 54 having a biased front edge 56 facing the frame entranceway 24 is mounted to leg 18 between the edges 50, and provides a resilient contact means for the inserted hangers 14, thus tending to maintain them in position and further insuring their continued positioning within the unit. The insert member may preferably extend approximately one half the distance between the legs.

In use, the hook portion of a hanger 14 is directed through entranceway 24 against latch arm 32. The inwardly directed force overcomes the bias of spring 44, causing the latch arm to pivot inwardly, as may be seen in FIG. 1, providing access to the interior of the support unit. As the hanger 14 passes the latch arm, the spring bias returns the arm to its position in contact with the opposed frame leg 20, thus retaining the hanger within the clamp, the hanger being supported by the unit body. It is to be appreciated that a force directed outwardly against the latch arm merely forces the arm into tighter contact with leg 20, thus preventing removal of an inserted hanger. When such removal is desired, however, operation of the handle 50, as depicted in FIG. 4, pivots the latch arm away from leg 20, allowing the hanger to be passed outwardly from between the frame legs.

I claim:

1. An improved hanger support apparatus comprising a U-shaped frame having a pair of parallel and spaced apart legs terminating in a pair of opposed ends, a latch arm pivotly mounted to the first of said legs proximate the end thereof and having a distal end adapted to contact said second leg at a point inwardly from the end thereof; spring means mounted to said latch arm for biasing said arm into said contact with said second leg, and a handle operatively connected to said latch arm to permit said latch arm to be selectively pivoted away from said second leg, said legs having opposed interior surfaces, and the latch arm disposed between said opposed surfaces.

2. The apparatus of claim 1, wherein said handle includes a first portion forming an axle upon which said latch arm rotates and a second part projecting outwardly from said frame at an angle to said first portion.

3. The apparatus of claim 2, wherein said latch arm is journaled within a pair of opposed flange elements mounted to said first arm.

4. The apparatus of claim 2, wherein a resilient bumper is mounted within said frame.

5. The apparatus of claim 4, wherein said bumper is mounted to said first arm leg.

6. The apparatus of claim 1, wherein said frame includes a pair of mounting ears.

7. The apparatus of claim 2, wherein said spring means is in the form of a coil mounted about said first part of said latch arm and has a first end bearing against said latch arm and a second end bearing against said frame.

8. An improved hanger support apparatus comprising a U-shaped frame having a pair of parallel and spaced apart legs terminating in a pair of opposed ends, a latch arm pivotly mounted to the first of said legs proximate the end thereof and having a distal end adapted to contact said second leg at a point inwardly from the end thereof; spring means mounted to said latch arm for biasing said arm into said contact with said second leg, and a handle operatively connected to said latch arm to permit said latch arm to be selectively pivoted away from said second leg, the latch arm being positioned and biased such that a hanger pressed inwardly against the latch arm passes into the U-shaped frame.

9. The apparatus of claim 8, wherein said handle includes a first portion forming an axle upon which said latch arm rotates and second part projecting outwardly from said frame at an angle to said first portion.

10. The apparatus of claim 1, wherein said latch arm is journaled within a pair of opposed flange elements mounted to said first arm.

11. The apparatus of claim 9, wherein a resilient bumper is mounted within said frame.

12. The apparatus of claim 11, wherein said bumper is mounted to said first leg.

13. The apparatus of claim 8, wherein said frame includes a pair of mounting ears.

14. The apparatus of claim 9, wherein said spring means is in the form of a coil mounted about said first part of said latch arm and has a first end bearing against said latch arm and a second end bearing against said frame.

* * * * *